(12) United States Patent
Xiao et al.

(10) Patent No.: US 8,743,755 B2
(45) Date of Patent: Jun. 3, 2014

(54) DOWNLINK RESOURCE SCHEDULING METHOD AND TRANSMISSION END FOR MULTIPLE-INPUT MULTIPLE-OUTPUT BEAM-FORMING SYSTEM

(75) Inventors: Huahua Xiao, Shenzhen (CN);
Zhaohua Lu, Shenzhen (CN);
Wanshuai Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 139 days.

(21) Appl. No.: 13/634,531

(22) PCT Filed: Jun. 13, 2010

(86) PCT No.: PCT/CN2010/073931
§ 371 (c)(1),
(2), (4) Date: Sep. 12, 2012

(87) PCT Pub. No.: WO2011/113234
PCT Pub. Date: Sep. 22, 2011

(65) Prior Publication Data
US 2013/0003691 A1    Jan. 3, 2013

(30) Foreign Application Priority Data
Mar. 17, 2010   (CN) .......................... 2010 1 0139324

(51) Int. Cl.
*H04B 7/00*    (2006.01)
(52) U.S. Cl.
USPC ............................. 370/310; 455/39; 709/223
(58) Field of Classification Search
CPC ............ H04B 7/0452; H04W 72/046; H04W 72/1247
USPC ............................. 370/310; 455/39; 709/223
See application file for complete search history.

(56) References Cited

U.S. PATENT DOCUMENTS

| | | | |
|---|---|---|---|
| 2006/0067269 A1* | 3/2006 | Jugl et al. | 370/329 |
| 2007/0042787 A1* | 2/2007 | Hsu et al. | 455/450 |
| 2009/0296663 A1* | 12/2009 | Wild | 370/335 |
| 2010/0046462 A1* | 2/2010 | Uwano et al. | 370/329 |
| 2012/0127940 A1* | 5/2012 | Lee et al. | 370/329 |

(Continued)

FOREIGN PATENT DOCUMENTS

| CN | 1878142 A | 12/2006 |
|---|---|---|
| CN | 1882156 A | 12/2006 |

(Continued)

OTHER PUBLICATIONS

Cross-layer Resource Allocation for the Downlink of SDMA Systems; by Song Xinghua, Wang Xiaoxiang and Wu Weiling, Beijing University of Posts and Telecommunications, Beijing, China; IEEE 2007.*

(Continued)

*Primary Examiner* — Hassan Kizou
*Assistant Examiner* — Deepa Belur
(74) *Attorney, Agent, or Firm* — Bright IP Law Offices

(57) ABSTRACT

The present invention provides a downlink resource scheduling method and a transmission end for a multiple-input multiple-output beam-forming (MIMO+BF) system. The transmission end performs the following steps of: dividing subordinate users into user groups according to respective MIMO+BF weights of the subordinate users; generating a scheduling priority coefficient for each of the user groups according to scheduling priority coefficients of respective users in the user group; allocating group resources to the user groups according to the respective scheduling priority coefficients of the user groups; and allocating sub-channel resources of the group resources to each user in the user groups according to the respective scheduling priority coefficients of users in the user groups.

11 Claims, 9 Drawing Sheets

(56) References Cited

U.S. PATENT DOCUMENTS

2012/0214530 A1* 8/2012 Molnar et al. ............... 455/513
2013/0301623 A1* 11/2013 Toda et al. ................... 370/336

FOREIGN PATENT DOCUMENTS

CN 101453736 A 6/2009
WO WO 2011072586 A1 * 6/2011

OTHER PUBLICATIONS

Scheduling in Multi-Cell environment using random beamforming; by Ming Gong, Ling Qiu, Jinkang Zhu; IEEE 2004.*
P.R. China, State Intellectual Property Office, International Search Reprot for International Application No. PCT/CN2010/073931, mailed Dec. 23, 2010.

* cited by examiner

DOWNLINK RESOURCE SCHEDULING METHOD AND TRANSMISSION END FOR MULTIPLE-INPUT MULTIPLE-OUTPUT BEAM-FORMING SYSTEM

CROSS REFERENCE TO RELATED APPLICATIONS

This application is the U.S. National Stage of International Patent Application No. PCT/CN2010/1073931 filed on Jun. 13, 2010, which claims priority to Chinese Patent Application No. 201010139324.5 filed on Mar. 17, 2010. Both the PCT Application and Chinese Application are hereby incorporated by reference in their entirety.

TECHNICAL FIELD OF THE INVENTION

The present invention relates to the field of communications, and in particular to a downlink resource scheduling method and a transmission end for a multiple-input multiple-output beam-forming (MIMO+BF) system.

BACKGROUND OF THE INVENTION

Based on the adaptive antenna principle, beam-forming performs weighting process for each antenna unit respectively using antenna arrays through the advanced signal processing algorithm, so as to make the antenna array aim at the direction of a useful signal in real time and form a zero point in the interference direction to suppress the interference signal, thereby improving the signal noise ratio (SNR), enhancing the system performance and expanding the system coverage area. FIG. 1 shows a diagram of a beam-forming system based on linear antenna array according to the relevant technology.

Multiple-input multiple-output (MIMO) is a communication system which arranges a plurality of antennas at the transmission end and the receiving end respectively and can improve the stability of link or increase the throughput of system without increasing bandwidth resources. The combination of MIMO with beam-forming forms a new technology which has advantages of both MIMO and beam-forming, that is, MIMO beam-forming which is abbreviated as MIMO+BF; the MIMO+BF not only has advantages of interference signal suppression of beam-forming, but also has advantages of link reliability or transmission rate enhancement of MIMO.

MIMO beam-forming generally has two implementation schemes. FIG. 2a shows a first diagram of a method for realizing MIMO beam-forming according to the relevant technology; the entire antenna array has M antennas which are divided into N sub-arrays, wherein each sub-array forms a beam, thus there are N beams totally; the N beams form an MIMO system of which the weight is an M×N dimensional matrix, wherein the ith column of elements is the weight of the ith sub-array; for the elements in the matrix, except that the antenna corresponding to the ith array has a non-zero value, the value of others is 0; for example, four antennas are divided into two groups evenly, the weight is $$W = \begin{pmatrix} w_{11}, w_{12}, 0.0 \\ 0.0, w_{13}, w_{14} \end{pmatrix}^T,$$

the weight also can be represented as a vector $W=(w_{11}, w_{12}, w_{13}, w_{14})^T$, wherein the two expressions are equivalent. FIG. 2b shows a second diagram of a method for realizing MIMO beam-forming according to the relevant technology; the entire antenna array has M antennas, wherein the M antennas have N beams, an MIMO system is formed among the beams and the weight of the MIMO system is an M×N dimensional matrix. In the application, the weight of the MIMO beam-forming is uniformly defined as an M×N dimensional matrix, which is marked as W. The transmission end called in the application is a device used for transmitting data or information, for example, macro base, micro base, etc.; the user called in the application is various terminals used for receiving data or information, for example, mobile station, handset, data cart, etc.

In the relevant technology of MIMO beam-forming, some factors would restrict the system to make full use of time frequency resources, thus the throughput of system is reduced; for example, in the partially used sub-channel (PUSC) frame structure of the worldwide interoperability for microwave access (Wimax) 16e protocol, the downlink sub-channel with 10M bandwidth is divided into 6 groups. FIG. 8 shows a diagram of group resources according to the relevant technology, in which, the odd-number group includes 6 sub-channels and the even-number group includes 4 sub-channels. Since the resource applies distributed mapping and uses a dedicated pilot frequency, each group resource can only use one beam-forming weight for data beam-forming, however, the beam-forming weights of different users are different; therefore, each user needs to be allocated with at least one group of sub-channels while the downlink sub-channel with 10M bandwidth is divided into 6 groups; therefore, there are at most 6 users having a scheduling chalice at the same moment, thus the number of accessible users is limited; besides, if some users only need a few sub-channel resources (for example, one sub-channel resource), the resources remained in the odd-number group or even-number group are wasted.

SUMMARY OF THE INVENTION

The main object of the present invention is to provide a downlink resource scheduling scheme for an MIMO+BF system, for solving the problems above.

In order to realize the object above, according to one aspect of the present invention, a downlink resource scheduling method for an MIMO+BF system is provided.

The downlink resource scheduling method for an MIMO+BF system according to the present invention comprises the steps of: dividing subordinate users into user groups according to respective MIMO+BF weights of the subordinate users; generating a scheduling priority coefficient for each of the user groups according to scheduling priority coefficients of respective users in the user group; allocating group resources to the user groups according to the respective scheduling priority coefficients of the user groups; and allocating sub-channel resources of the group resources to each user in the user groups according to the respective scheduling priority coefficients of users in the user groups.

Further, the step of dividing users into user groups according to the MIMO+BF weights of the respective users further comprises the steps of: selecting a benchmark user from users that have not been assigned to any user group; identifying, among the users that have not been assigned to any user group, users whose respective MIMO+BF weight distance to the benchmark user is less than or equal to a preset value, and grouping the identified users and the benchmark user into a respective user group; transferring the users in the respective user group from the users that have not been assigned to any user group to users that have been assigned to at least one of the user groups; repeating the aforementioned steps until no user has not been assigned to a user group.

Further, the step of dividing users into user groups according to the MIMO+BF weights of the respective users further comprises the steps of: selecting a benchmark user from users that have not been assigned to any user group; identifying, among the users that have not been assigned to any user group, users whose respective MIMO+BF weight distance to the benchmark user is less than or equal to a preset value, wherein an MIMO+BF weight distance between any two of the identified users is less than or equal to the preset value, and grouping the identified users and the benchmark user into a respective user group; transferring the users in the respective user group from the users that have not been assigned to any user group to users that have been assigned to at least one of the user groups; repeating the aforementioned steps until no more than one user is left to be assigned to any user group.

Further, the method further comprises the steps of comprises: generating a beam-forming weight for a respective user group according to a respective MIMO+BF weight of each user in the user group; and performing beam-forming for data associated with scheduled users in the user group by using the beam-forming weight of the user group.

In order to realize the object above, according to another aspect of the present invention, a transmission end is provided.

The transmission end according to the present invention comprises: a grouping module, configured to divide subordinate users into user groups according to respective MIMO+BF weight distances of the subordinate users; a first generation module, configured to generate a scheduling priority coefficient for each of the user groups according to scheduling priority coefficients of respective users in the user group; a first allocation module, configured to allocate resources to the user groups according to the respective scheduling priority coefficients of the user groups; and a second allocation module, configured to allocate sub-channel resources of the group resources to each user in the user groups according to the respective scheduling priority coefficients of users in the user groups.

Further, the grouping module comprises: a first selection module, configured to select a benchmark user from users that have not been assigned to any user group; a second selection module, configured to identify, among the users that have not been assigned to any user group, users whose respective MIMO+BF weight distance to the benchmark user is less than or equal to a preset value, and configured to group the identified users and the benchmark user into a respective user group; a first transfer module, configured to transfer the users in the respective user group from the users that have not been assigned to any user group to users that have been assigned to at least one of the user groups; and a first invocation module, configured to repeatedly invoke the first selection module, the second selection module and the first transfer module until no user has not been assigned to a user group.

Further, the grouping module comprises: a third selection module, configured to select a benchmark user from users that have not been assigned to any user group; a fourth selection module, configured to identify, among the users that have not been assigned to any user group, users whose respective MIMO+BF weight distance to the benchmark user is less than or equal to a preset value, wherein an MIMO+BF weight distance between any two of the identified users is less than or equal to the preset value, and configured to group the identified users and the benchmark user into a respective user group; a second transfer module, configured to transfer the users in the respective user group from the users that have not been assigned to any user group to users that have been assigned to at least one of the user groups; and a second invocation module, configured to repeatedly invoke the third selection module, the fourth selection module and the second transfer module until no more than one user is left to be assigned to any user group.

Further, the transmission end further comprises: a second generation module, configured to generate a beam-forming weight for a respective user group according to a respective MIMO+BF weight of each user in the user group; and a beam-forming module, configured to perform beam-forming for data associated with scheduled users in the user group by using the beam-forming weight of the user group.

With the present invention, users are divided into user groups according to MIMO+BF weights, group resources are allocated to the user groups and then sub-channel resources are allocated to the users in the groups, thus the problem in the relevant technology that one user needs to be allocated with at least one group of resources is solved; therefore, the number of accessible users is increased and the downlink resources are saved.

BRIEF DESCRIPTION OF THE DRAWINGS

For a better understanding of this invention, accompanying drawings described hereinafter are provided to constitute one part of the specification to illustrate this invention in conjunction with the schematic embodiments of this invention and the description but to limit this invention. In the accompanying drawings:

FIG. 8 shows a diagram of group resources according to the relevant technology;

FIG. 9 shows a structure diagram of a transmission end according to the embodiment of the invention;

DETAILED DESCRIPTION OF THE INVENTION

The invention is described below in detail by reference to accompanying drawings in conjunction with embodiments. It should be noted that the embodiments and the characteristics of the embodiments can be combined if no conflict is caused.

Figure 1:
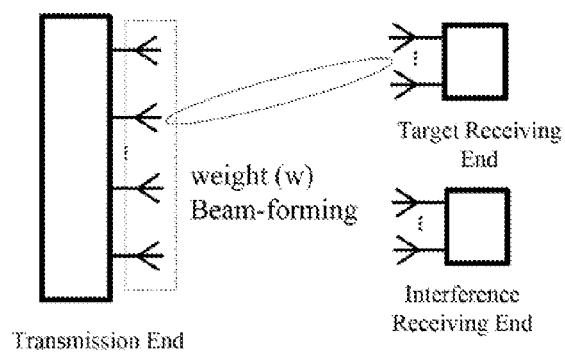
FIG. 1 shows a diagram of a beam-forming system based on linear antenna array according to the relevant technology.
Figure 2:
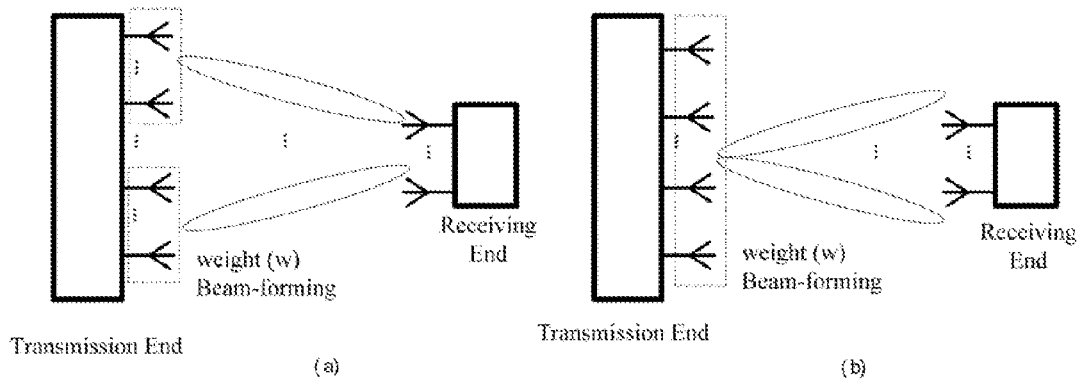
FIG. 2 shows a diagram of a method for realizing MIMO+BF according to the relevant technology.

The MIMO+BF system can apply the beam-forming system shown in the FIG. 2, wherein the system comprises a transmission end and subordinate users thereof.

Figure 3:
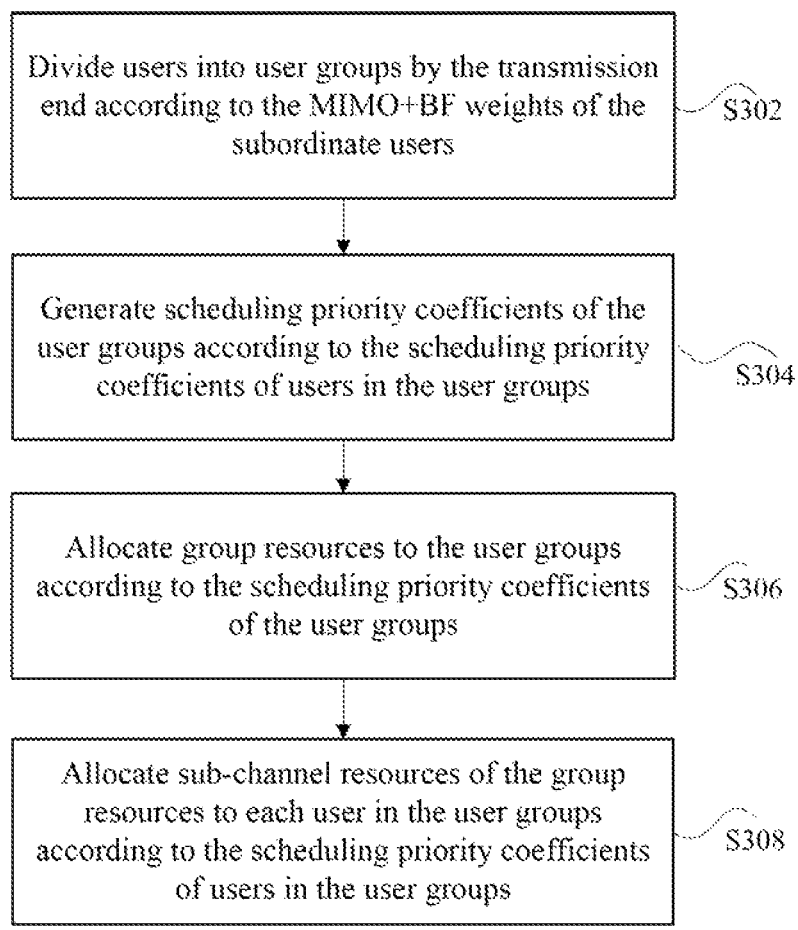
FIG. 3 shows a flowchart of a downlink resource scheduling method for an MIMO+BF system according to the embodiment of the invention.

FIG. 3 shows a flowchart of a downlink resource scheduling method for an MIMO+BF system according to the embodiment of the invention; wherein the method comprises the following steps of:

Step 302: dividing subordinate users by the transmission end into user groups according to respective MIMO+BF weights of the subordinate users;

Step 304: generating a scheduling priority coefficient for each of the user groups according to scheduling priority coefficients of respective users in the user group;

Step 306: allocating group resources to the user groups according to the respective scheduling priority coefficients of the user groups; and Step 308: allocating sub-channel resources of the group resources to each user in the user groups according to the respective scheduling priority coefficients of users in the user groups.

In the relevant technology, since the resource applies distributed mapping and uses a dedicated pilot frequency, each group resource can only use one beam-forming weight for data beam-forming, however, the beam-forming weights of different users are different; therefore, each user needs to be allocated with at least one group of sub-channels; in the embodiment, users are divided into user groups according to MIMO+BF weights, group resources are allocated to the user groups and then sub-channel resources are allocated to the users in the groups, thus the problem in the relevant technology that one user needs to be allocated with at least one group of resources is solved; therefore, the number of accessible users is increased and the downlink resources are saved.

Preferably, the step of dividing subordinate users into user groups by the transmission end according to respective MIMO+BF weights of the subordinate users comprises the steps of: selecting a benchmark user from users that have not been assigned to any user group; identifying, among the users that have not been assigned to any user group, users whose respective MIMO+BF weight distance to the benchmark user is less than or equal to a preset value, and grouping the identified users and the benchmark user into a respective user group; transferring the users in the respective user group from the users that have not been assigned to any user group to users that have been assigned to at least one of the user groups; and repeating the aforementioned steps until no user has not been assigned to a user group.

In the embodiment, by identifying all the users whose MIMO+BF weight distance to the benchmark user is less than or equal to a preset value and grouping the identified users and the benchmark user into a respective user group, the MIMO+BF weights of users in the same user group are similar, thus the users in the same user group can use the same weight to perform beam-forming.

Figure 4:
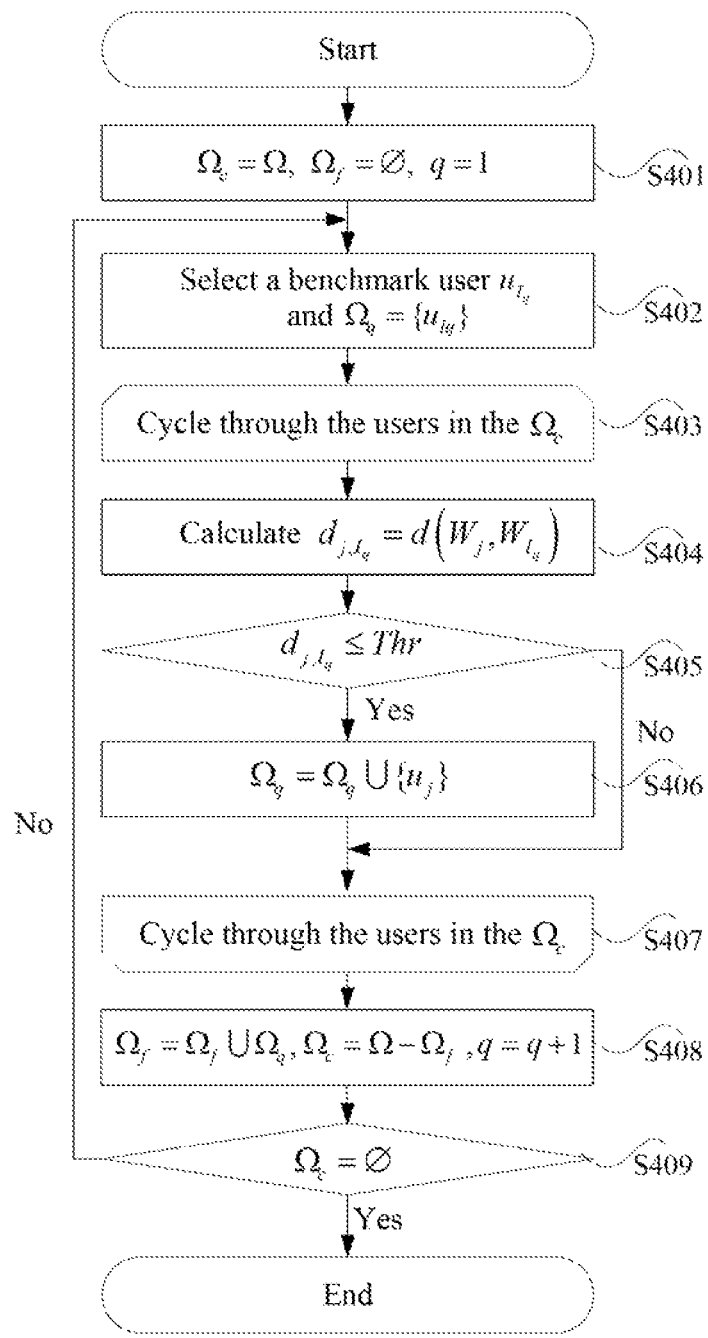
FIG. 4 shows a first diagram of user groups according to the embodiment of the invention.

FIG. 4 shows a diagram for dividing subordinate users into groups according to the MIMO+BF weights of the subordinate users according to the preferred embodiment of the invention, wherein the method comprises the steps of:

Step 401: initializing by the transmission end the current search set $\Omega_c$ to be the set $\Omega$ of all users served by the transmission end, that is $\Omega_c=\Omega$, wherein the set of grouped users is $\Omega_f=\emptyset$ setting the grouped number as q=1.

Step 402: selecting in the current search set $\Omega_c$ a user $u_{I_q}$ with index of $I_q$ as the benchmark user of a first user group by the transmission end based on certain search principles, wherein the benchmark user can be the user first sequenced, a randomly selected user, the user with highest SNR, the user with highest scheduling priority or the user with highest timeliness.

Step 403: cycling through the users in the $\Omega_c$ and selecting each user of the $\Omega_c$.

Step 404: calculating the distance $d_{j,i}=d(W_j, W_i)$ of MIMO+BF weight between the other users j (j=1, ... |$\Omega_c$|, j≠I) in the $\Omega_c$ and the user $u_{I_q}$, wherein $d_{i,j}=d(W_i,W_j)$ includes one of the following:

$$d(W_i, W_j) = \lambda_{max}(W_i W_i^H - W_j W_j^H),$$

$$d(W_i, W_j) = \sum_{k=1}^{M} \sum_{h=1}^{N} |w_{k,h}^{(i)} - w_{k,h}^{(h)}|^P,$$

$$d(W_i, W_j) = \left(\sum_{k=1}^{M} \sum_{h=1}^{N} |w_{k,h}^{(i)} - w_{k,h}^{(h)}|^P\right)^{\frac{1}{P}},$$

$$d(W_i, W_j) = \max\{|w_{1,1}^{(j)} - w_{1,1}^{(j)}|^P, \ldots, |w_{M,N}^{(j)} - w_{M,N}^{(i)}|^P\},$$

in which, $\lambda_{max}(W_i W_i^H - W_j W_j^H)$ represents the maximum eigenvalue of matrix $W_i W_i^H - W_j W_j^H$;

$$W_i = \begin{pmatrix} w_{1,1}^{(i)} & \cdots & w_{1,N}^{(i)} \\ \vdots & \ddots & \vdots \\ w_{M,1}^{(i)} & \cdots & w_{M,N}^{(i)} \end{pmatrix}$$

represents the MIMO+BF weight of the user i of the two users; $w_{m,I}^{(i)}$ represents the MIMO+BF weight coefficient from the mth transmission antenna to the Ith beam associated with the user i;

$$W_j = \begin{pmatrix} w_{1,1}^{(j)} & \cdots & w_{1,N}^{(j)} \\ \vdots & \ddots & \vdots \\ w_{M,1}^{(j)} & \cdots & w_{M,N}^{(j)} \end{pmatrix}$$

represents the MIMO+BF weight of the user j of the two users; $w_{m,I}^{(j)}$ represents the MIMO+BF weight coefficient from the mth transmission antenna to the Ith beam associated with the user j; wherein m=1, 2, ..., M; I=1, 2, ..., N; M represents the number of antennas of the transmission end; N represents the number of beams transmitted by the antennas of the transmission end; P is a constant greater than zero; $W_i^H$ represents that a conjugate transpose calculation is performed to the matrix $W_i$.

Step 405: determining whether $d_{j,I_q} \leq$ Thr is satisfied, wherein Thr is a preset value, if it is yes, proceeding to Step 406, otherwise, proceeding to Step 407.

Step 406: adding the user j and the benchmark user into a user group set $\Omega_q$.

Step 407: cycling through the users in the $\Omega_c$ and selecting each user of the $\Omega_c$.

By the steps above, all users j satisfying $d_{j,I_q} \leq$ Thr are selected and are added into a user group set $\Omega_q$ together with the benchmark user, wherein all users belonging to the $\Omega_q$ form a user group.

Step 408: updating the grouped user set $\Omega_f$ as $\Omega_f=\Omega_f \cup \Omega_q$, updating the current search set as $\Omega_c=\Omega-\Omega_f$ that is, transferring the users in the $\Omega_q$ from the to-be-grouped user set to the grouped user set; and updating q=q+1.

Step 409: determining whether $\Omega_c$ is a null set, if yes, ending the flow, otherwise, returning to Step 402.

Figure 5:
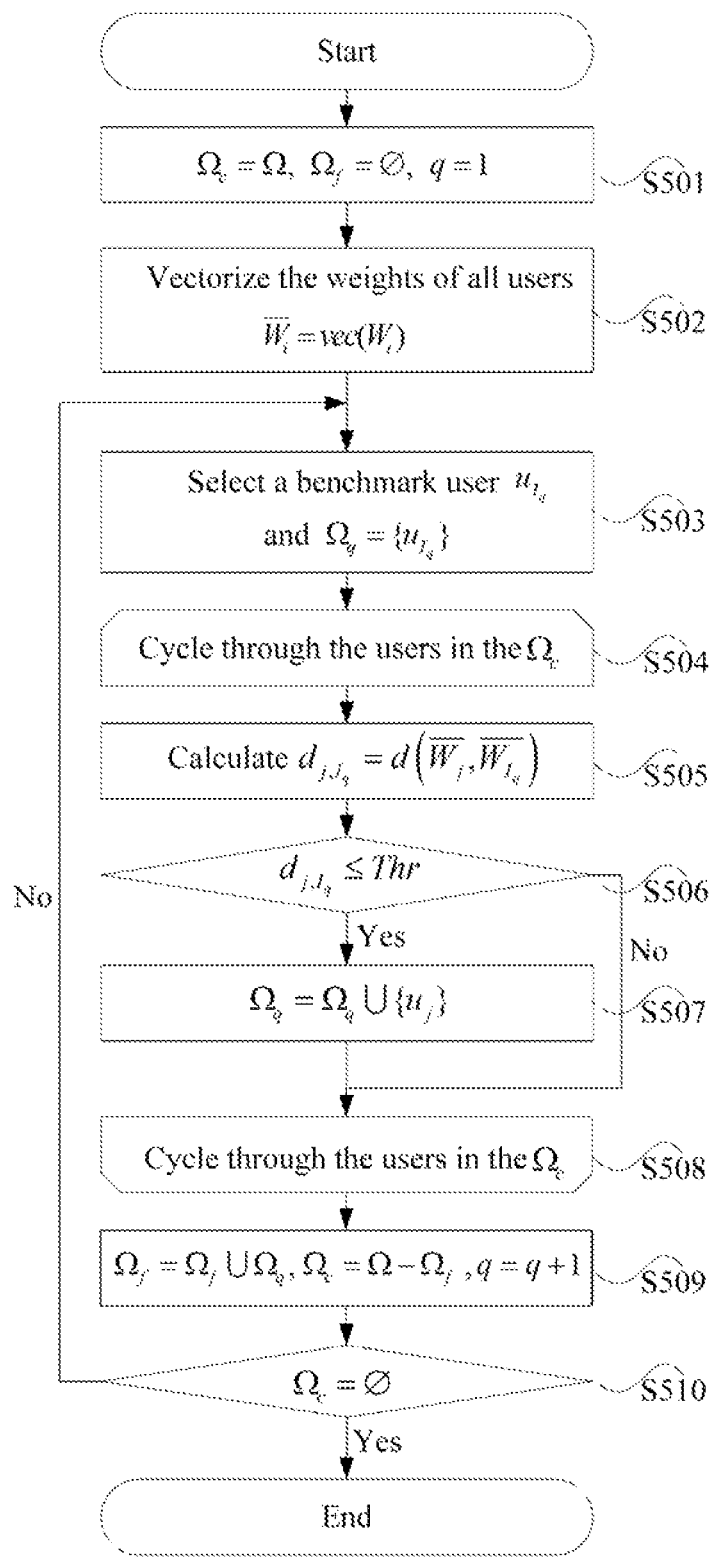
FIG. 5 shows a second diagram of user groups according to the embodiment of the invention.

FIG. 5 shows a diagram for dividing subordinate users into groups according to the MIMO+BF weights of the subordinate users according to the preferred embodiment of the invention, wherein the method comprises the steps of:

Step 501: initializing by the transmission end the current search set $\Omega_c$ to be the set $\Omega$ of all users served by the transmission end, that is $\Omega_c=\Omega$, wherein the set of grouped users is $\Omega_f \neq \varnothing$, setting the grouped number as q=1.

Step 502: transforming the weights of all users into a vector, that is, $\overline{W}_i=\text{vec}(W_i)$, wherein vec is a matrix vectorization operation, vector $\overline{W}_i$ is the vector formed by all elements or all non-zero elements in the matrix $W_i$, $W_i$ is the MIMO+BF weight of the ith user, i=1, ..., $N_u$, wherein $N_u$ is the number of users.

For example, the matrix $$W = \begin{pmatrix} a_{11} & a_{12} \\ a_{21} & a_{22} \end{pmatrix},$$

if vectorized, becomes $\overline{W}_i=(a_{11}, a_{12}, a_{21}, a_{22})$, and $\overline{W}_i$ is renumbered to become $\overline{W}_i=(w_{i1}, w_{i2}, w_{i3}, w_{i4})$.

Step 503: selecting in the current search set $\Omega_c$ a user $u_{I_q}$ with index of $I_q$ as the benchmark user of the first user group by the transmission end based on certain search principles, wherein the selected benchmark user can be the user first sequenced, a randomly selected user, the user with highest SNR, the user with highest scheduling priority or the user with highest timeliness.

Step 504: cycling through the users in the $\Omega_c$ and selecting each user of the $\Omega_c$.

Step 505: calculating the distance $d_{i,j}$ of MIMO+BF weight between all other users j (j=1, ... $|\Omega_c|$, j≠$I_q$) in the $\Omega_c$ and the user $u_{I_q}$, wherein $d_{i,j}=d(\overline{W}_i, \overline{W}_j)$ includes one of the following:

$$d(\overline{W}_i, \overline{W}_j) = \sqrt{1 - \left|\sum_k w_{j,k}^* * w_{i,k}\right|^p},$$

$$d(\overline{W}_i, \overline{W}_j) = \sum_k |w_{j,k} - w_{i,k}|^p,$$

$$d(\overline{W}_i, \overline{W}_j) = \left(\sum_k |w_{j,k} - w_{i,k}|^p,\right)^{\frac{1}{p}},$$

$$d(\overline{W}_i, \overline{W}_j) = \max\{|w_{j,1} - w_{i,1}|^p, \ldots, |w_{j,L} - w_{i,L}|^p\},$$

in which, $\overline{W}_i=(w_{i,1}, w_{i,2}, \ldots, w_{i,L})^T$ or $\overline{W}_i=(w_{i,1}, w_{i,2}, \ldots, w_{i,L})$ is a vector of the MIMO+BF weight of the user i of the two users; $w_{i,L}$ is one of the MIMO+BF weight coefficients corresponding to the user i; $\overline{W}_j=(w_{j,1}, w_{j,2}, \ldots, w_{j,L})^T$ or $\overline{W}_j=(w_{j,1}, w_{j,2}, \ldots, w_{j,L})$ is a vector of the MIMO+BF weight of the user j of the two users; $w_{j,L}$ is one of the MIMO+BF weight coefficients corresponding to the user j; wherein l=1, 2, ..., L; L is the number of elements or non-zero elements in the MIMO+BF matrix of each user; P>0 and is a constant.

Step 506: determining whether $d_{j,I_q} \leq$ Thr is satisfied, wherein Thr is a preset value, if it is yes, proceeding to Step 507, otherwise, proceeding to Step 508.

Step 507: adding the user j and the benchmark user into a user group set $\Omega_q$.

Step 508: cycling through the users in the $\Omega_c$ and selecting each user of the $\Omega_c$.

By the steps above, all users j satisfying $d_{j,I_q} \leq$ Thr are selected and are added into a user group set $\Omega_q$ together with the benchmark user, wherein all users belonging to the $\Omega_q$ form a user group.

Step 509: updating the grouped user set $\Omega_f$ as $\Omega_f=\Omega_f \cup \Omega_q$, updating the current search set as $\Omega_c=\Omega-\Omega_f$, that is, transferring the users in the $\Omega_q$ from the to-be-grouped user set to the grouped user set; and updating q=q+1.

Step 510: determining whether $\Omega_c$ is a null set, if yes, ending the flow, otherwise, returning to Step 503.

Preferably, the step of dividing subordinate users into user groups by the transmission end according to the MIMO+BF weights of the subordinate users comprises the steps of: selecting a benchmark user from users that have not been assigned to any user group; identifying, among the users that have not been assigned to any user group, users whose respective MIMO+BF weight distance to the benchmark user is less than or equal to a preset value, wherein an MIMO+BF weight distance between any two of the identified users is less than or equal to the preset value, and grouping the identified users and the benchmark user into a respective user group; transferring the users in the respective user group from the users that have not been assigned to any user group to users that have been assigned to at least one of the user groups; and repeating the aforementioned steps until no more than one user is left to be assigned to any user group.

In the embodiment, by identifying all users which have an MIMO+BF weight distance to the benchmark user less than or equal to a preset value and have an MIMO+BF weight distance to each other less than or equal to the preset value and grouping the selected users and the benchmark user into a user group, the MIMO+BF weights of users in the same user group are similar, thus the users in the same user group can use the same weight to perform beam-forming.

Figure 6:
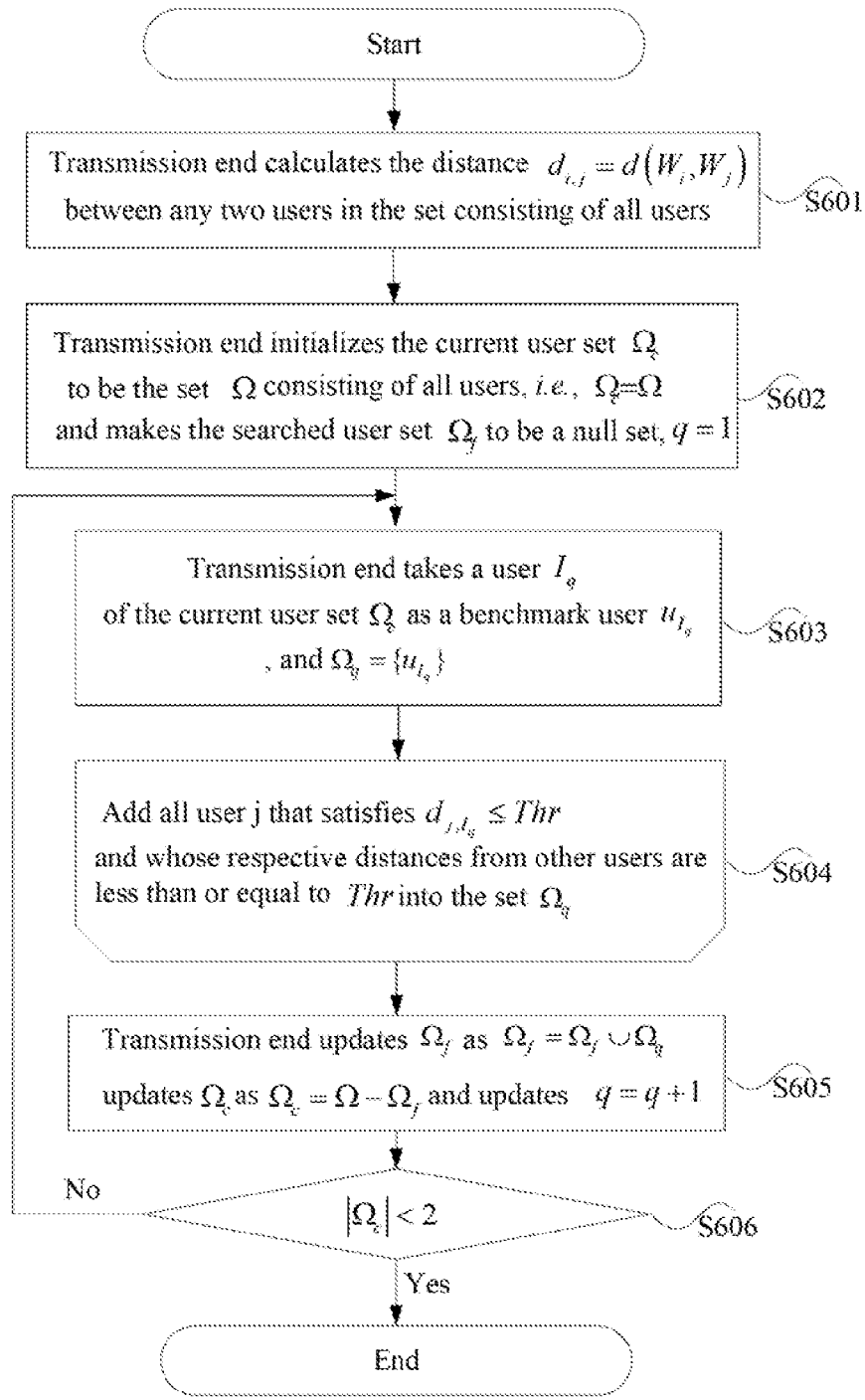
FIG. 6 shows a third diagram of user groups according to the embodiment of the invention.

FIG. 6 shows a diagram for dividing subordinate users into groups according to the MIMO+BF weights of the subordinate users according to the preferred embodiment of the invention, wherein the method comprises the steps of:

Step 601: calculating the MIMO+BF distance $d_{i,j}=d(W_i, W_j)$ between any two users i, j of all subordinate $N_u$ users by the transmission end, wherein i, j=1, 2, ..., $N_u$, and j≠i.

Step 602: initializing by the transmission end the current search set $\Omega_c$ to be the set $\Omega$ of all users served by the transmission end, that is $\Omega_c=\Omega$, wherein the set of grouped users is $\Omega_f=\varnothing$, setting the grouped number as q=1.

Step 603: selecting in the current user set $\Omega_c$ a user $u_{I_q}$ with index of $I_q$ as the benchmark user of the current user group by the transmission end based on certain search principles; and $\Omega_q=\{u_{I_q}\}$, wherein the selected benchmark user can be the user first sequenced, a randomly selected user, the user with highest SNR, the user with highest scheduling priority or the user with highest timeliness.

Step 604: forming the user $u_{I_q}$ and all other users $u_j$, which satisfy the MIMO+BF weight distance $d_{j,I_q} \leq$ Thr, have a distance to each other less than or equal to Thr and has an index of j, into a user group set $\Omega_q$ by the transmission end, wherein Thr is a preset value.

$d_{i,j}=d(W_i, W_j)$ includes one of the following:

$$d(W_i, W_j) = \lambda_{max}(W_i W_i^H - W_j W_j^H),$$

$$d(W_i, W_j) = \sum_{k=1}^{M} \sum_{h=1}^{N} |w_{k,h}^{(j)} - w_{k,h}^{(i)}|^p,$$

-continued $$d(W_i, W_j) = \left(\sum_{k=1}^{M}\sum_{h=1}^{N}|w_{k,h}^{(j)} - w_{k,h}^{(i)}|^p\right)^{\frac{1}{p}},$$

$$d(W_i, W_j) = \max\{|w_{1,1}^{(j)} - w_{1,1}^{(i)}|^p, \ldots, |w_{M,N}^{(j)} - w_{M,N}^{(i)}|^p\},$$

in which $\lambda_{max}(W_iW_i^H - W_jW_j^H)$ represents the maximum eigenvalue of matrix $W_iW_i^H - W_jW_j^H$;

$$W_i = \begin{pmatrix} w_{1,1}^{(i)} & \cdots & w_{1,N}^{(i)} \\ \vdots & \ddots & \vdots \\ w_{M,1}^{(i)} & \cdots & w_{M,N}^{(i)} \end{pmatrix}$$

represents the MIMO+BF weight of the user i of the two users $w_{m,I}^{(i)}$ represents the MIMO+BF weight coefficient from the mth transmission antenna to the Ith beam associated with the user i;

$$W_j = \begin{pmatrix} w_{1,1}^{(j)} & \cdots & w_{1,N}^{(j)} \\ \vdots & \ddots & \vdots \\ w_{M,1}^{(j)} & \cdots & w_{M,N}^{(j)} \end{pmatrix}$$

represents the MIMO+BF weight of the user j of the two users; $w_{m,I}^{(j)}$ represents the MIMO+BF weight coefficient from the mth transmission antenna to the Ith beam associated with the user j; wherein m=1, 2, ..., M; I=1, 2, ..., N; M represents the number of all antennas of the transmission end; N represents the number of all beams transmitted by all antennas of the transmission end; P is set to a constant greater than zero; $W_i^H$ represents that a conjugate transpose calculation is performed to the matrix $W_i$.

The specific method for obtaining the user set $\Omega_q$ is: putting the users satisfying $d_{j,I_q} \leq Thr$ into the set $\Omega_{temp}$, selecting a user (the user is not $u_{I_q}$) from the $\Omega_{temp}$, deleting the users which have an MIMO+BF weight distance to the selected user greater than Thr from the $\Omega_{temp}$, reselecting a user (different from the user selected previously) from the updated $\Omega_{temp}$, deleting the users which have an MIMO+BF weight distance to the newly selected user greater than Thr from the $\Omega_{temp}$, by such analogy, so that the distance between any two of the users in the $\Omega_{temp}$ is less than or equal to Thr finally, then ordering $\Omega_q = \Omega_{temp}$.

When deleting users in the $\Omega_{temp}$, it is not necessarily to execute the last step until the distance between any two of the users in the $\Omega_{temp}$ is less than or equal to Thr, it can make the $\Omega_{temp}$ as $\Omega_q$ after one or more times of deleting.

Step 605: updating the grouped user set $\Omega_f$ as $\Omega_f = \Omega_f \cup \Omega_q$, updating the current search set as $\Omega_c = \Omega - \Omega_f$, that is, moving the users in the $\Omega_q$ from the to-be-grouped user set to the grouped user set; and update q=q+1.

Step 606: determining whether $|\Omega_c| \geq 2$ is satisfied, if yes, returning to Step 603, otherwise, ending the flow.

Figure 7:
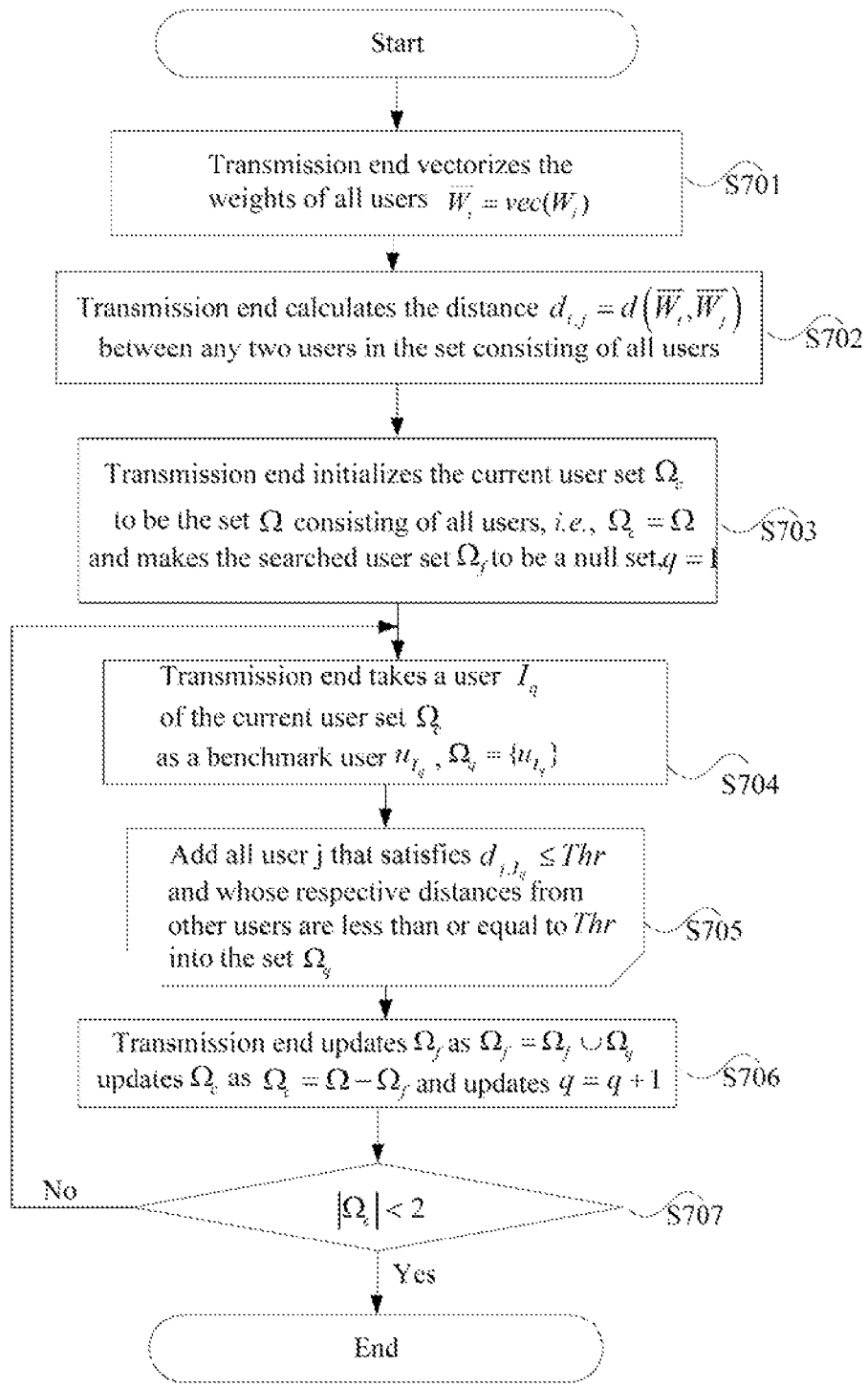
FIG. 7 shows a fourth diagram of user groups according to the embodiment of the invention.

FIG. 7 shows a diagram for dividing subordinate users into groups according to the MIMO+BF weights of the subordinate users according to the preferred embodiment of the invention, wherein the method comprises the steps of:

Step 701: calculating by the transmission end the vectorization forms $\overline{W}_i = vec(W_i)$ of the MIMO+BF weights of all $N_u$ subordinate users of the transmission end, wherein vec is a matrix vectorization operation, vector $\overline{W}_i$ is the vector formed by all elements or all non-zero elements in the matrix $W_i$. $W_i$ is the MIMO+BF weight of the ith user, i=1, ..., $N_u$.

Step 702: calculating by the transmission end the vector-formed MIMO+BF weight distance $d_{i,j} = d(\overline{W}_i, \overline{W}_j)$ between any two users i, j of all $N_u$ users served by the transmission end, wherein i, j=1, 2, ..., $N_u$, and j≠i; wherein $d_{i,j} = d(\overline{W}_i, \overline{W}_j)$ includes one of the following:

$$d(\overline{W}_i, \overline{W}_j) = \sqrt{1 - \left|\sum_k w_{j,k}^* * w_{i,k}\right|^p},$$

$$d(\overline{W}_i, \overline{W}_j) = \sum_k |w_{j,k} - w_{i,k}|^p,$$

$$d(\overline{W}_i, \overline{W}_j) = \left(\sum_k |w_{j,k} - w_{i,k}|^p\right)^{\frac{1}{p}},$$

$$d(\overline{W}_i, \overline{W}_j) = \max\{|w_{j,1} - w_{i,1}|^p, \ldots, |w_{j,L} - w_{i,L}|^p\},$$

in which, $\overline{W}_i = (w_{i,1}, w_{i,2}, \ldots, w_{i,L})^T$ or $\overline{W}_i = (w_{i,1}, w_{i,2}, \ldots, w_{i,L})$ is a vector of the MIMO+BF weight of the user i of the two users; $w_{i,L}$ is one of the MIMO+BF weight coefficients corresponding to the user i; $\overline{W}_j = (w_{j,1}, w_{j,2}, \ldots, w_{j,L})^T$ or $\overline{W}_j = (w_{j,1}, w_{j,2}, \ldots, w_{j,L})$ is a vector of the MIMO+BF weight of the user j of the two users; $w_{j,L}$ is one of the MIMO+BF weight coefficients corresponding to the user j; wherein l=1, 2, ..., L; L is the number of elements or non-zero elements in the MIMO+BF matrix of each user; P is set to a constant greater than zero.

Step 703: initializing by the transmission end the current search set $\Omega_c$ to be the set $\Omega$ of all users served by the transmission end, that is $\Omega_c = \Omega$, wherein the set of grouped users $\Omega_f = \emptyset$, setting the grouped number as q=1.

Step 704: selecting by the transmission end in the current user set $\Omega_c$ a user $u_{I_q}$ with index of $I_q$ as the benchmark user of the current user group served by the transmission end based on certain search principles, and $\Omega_q = \{u_{I_q}\}$, wherein the selected benchmark user can be the user first sequenced, a randomly selected user, the user with highest SNR, the user with highest scheduling priority or the user with highest timeliness.

Step 705: forming the user $u_{I_q}$ and all other users $u_j$, which satisfy the MIMO+BF weight distance $d_{j,I_q} \leq Thr$, have a distance to each other less than or equal to Thr and has an index of j, into a user group set $\Omega_q$ by the transmission end, wherein Thr is a preset value.

The specific method for obtaining the user set $\Omega_q$ is: putting the users satisfying $d_{j,I_q} \leq Thr$ into the set $\Omega_{temp}$, selecting a user (the user is not $u_{I_q}$) from the $\Omega_{temp}$, deleting the users which have an MIMO+BF weight distance to the selected user greater than Thr from the $\Omega_{temp}$, reselecting a user (different from the user selected previously) from the updated $\Omega_{temp}$, deleting the users which have an MIMO+BF weight distance to the newly selected user greater than Thr from the $\Omega_{temp}$, by such analogy, so that the distance between any two of the users in the $\Omega_{temp}$ is less than or equal to Thr finally, then ordering $\Omega_q = \Omega_{temp}$.

When deleting users in the $\Omega_{temp}$, it is not necessarily to execute the last step until the distance between any two of the users in the $\Omega_{temp}$ is less than or equal to Thr, it can make the $\Omega_{temp}$ as $\Omega_q$ after one or more times of deleting.

Step 706: updating the grouped user set $\Omega_f$ as $\Omega_f = \Omega_f \cup \Omega_q$, updating the current search set as $\Omega_c = \Omega - \Omega_f$, that is, transferring the users in the $\Omega_q$ from the to-be-grouped user set to the grouped user set; and update q=q+1.

Step 707; determining whether $|\Omega_c|\geq 2$ is satisfied, if yes, returning to Step 704, otherwise, ending the flow.

Preferably, the MIMO+BF weight distance $d_{i,j}=d(W_i, W_j)$ between two users includes one of the following:

$$d(W_i, W_j) = \lambda_{max}(W_i W_i^H - W_j W_j^H),$$

$$d(W_i, W_j) = \sum_{k=1}^{M}\sum_{h=1}^{N} |w_{k,h}^{(j)} - w_{k,h}^{(i)}|^P,$$

$$d(W_i, W_j) = \left(\sum_{k=1}^{M}\sum_{h=1}^{N} |w_{k,h}^{(j)} - w_{k,h}^{(i)}|^P\right)^{\frac{1}{P}},$$

$$d(W_i, W_j) = \max\{|w_{1,1}^{(j)} - w_{1,1}^{(i)}|^P, \ldots, |w_{M,N}^{(j)} - w_{M,N}^{(i)}|^P\},$$

in which, $\lambda_{max}(W_i W_i^H - W_j W_j^H)$ represents the maximum eigenvalue of matrix $W_i W_i^H - W_j W_j^H$;

$$W_i = \begin{pmatrix} w_{1,1}^{(i)} & \cdots & w_{1,N}^{(i)} \\ \vdots & \ddots & \vdots \\ w_{M,1}^{(i)} & \cdots & w_{M,N}^{(i)} \end{pmatrix}$$

represents the MIMO+BF weight of the user i of the two users $w_{m,I}^{(i)}$ represents the MIMO+BF weight coefficient from the mth transmission antenna to the Ith beam associated with the user i;

$$W_j = \begin{pmatrix} w_{1,1}^{(j)} & \cdots & w_{1,N}^{(j)} \\ \vdots & \ddots & \vdots \\ w_{M,1}^{(j)} & \cdots & w_{M,N}^{(j)} \end{pmatrix}$$

represents the MIMO+BF weight of the user j of the two users; $w_{m,I}^{(j)}$ represents the MIMO+BF weight coefficient from the mth transmission antenna to the Ith beam associated with the user j; wherein m=1, 2, . . . , M; I=1, 2, . . . , N; M represents the number of all antennas of the transmission end; N represents the number of all beams transmitted by all antennas of the transmission end; P is set to a constant greater than zero.

The embodiment provides a plurality of methods for calculating the MIMO+BF distance, so that the calculation of the MIMO+BF distance is more flexible.

Preferably, the distance $d_{i,j}=(\overline{W_i}, \overline{W_j})$ of vector-formed MIMO+BF weight between two users includes one of the following:

$$d(\overline{W_i}, \overline{W_j}) = \sqrt{1 - \left|\sum_k w_{j,k}^* * w_{i,k}\right|^P},$$

$$d(\overline{W_i}, \overline{W_j}) = \sum_k |w_{j,k} - w_{i,k}|^P,$$

$$d(\overline{W_i}, \overline{W_j}) = \left(\sum_k |w_{j,k} - w_{i,k}|^P\right)^{\frac{1}{P}},$$

$$d(\overline{W_i}, \overline{W_j}) = \max\{|w_{j,1} - w_{i,1}|^P, \ldots, |w_{j,N} - w_{i,L}|^P\},$$

in which, $\overline{W_i}=(w_{i,1}, w_{i,2}, \ldots, w_{i,L})^T$ or $\overline{W_i}=(w_{i,1}, w_{i,2}, \ldots, w_{i,L})$ represents a vector of the MIMO+BF weight of the user i of the two users; $w_{i,j}$ is one of the MIMO+BF weight coefficients corresponding to the user i; $\overline{W_j}=(w_{j,1}, w_{j,2}, \ldots, w_{j,L})^T$ or $\overline{W_j}=(w_{j,1}, w_{j,2}, \ldots, w_{j,L})$ is a vector of the MIMO+BF weight of the user j of the two users; $w_{j,i}$ is one of the MIMO+BF weight coefficients corresponding to the user j; wherein I=1, 2, . . . , L; L represents the number of elements or non-zero elements in the MIMO+BF weight matrix of each user; P is set to a constant greater than zero.

The embodiment provides a plurality of methods for calculating the vector-formed MIMO+BF distance, so that the calculation of the MIMO+BF distance is more flexible.

Preferably, the beam-forming weight of the user group is generated according to the MIMO+BF weight of each user in the user group; the data of all scheduled users in the user group is beam-formed using the beam-forming weight of the user group; after beam-forming is performed, the data is transmitted to the user.

The embodiment performs beam-forming for the users of the same user group using the same bean forming weight, so that the data of the users in the same group can be transmitted in the same group resource.

Preferably, the step of generating the beam-forming weight of the user group according to the MIMO+BF weight of each user in the user group comprises a step of: generating the MIMO+BF weight $$W_{BF} = \sum_{i=1}^{S} \alpha_i W_i$$

of the user group, in which, $W_i$ represents the MIMO+BF weight of the ith scheduled user in the user group; the number of the scheduled users in the user group is S; $\alpha_i$ represents the weight coefficient of the ith user in the user group; $\alpha_i$ is a nonnegative number and $$\sum_{i=1}^{S} \alpha_i = 1.$$

The embodiment realizes the generation of MIMO+BF weight of the user group.

Preferably, $$\alpha_i = \frac{1}{S} \text{ or } \alpha_i = P_j/P,$$

in which, $p_i$ represents the size of the sub-channel resources allocated to the ith scheduled user in the user group; P represents the sum of the sub-channel resources allocated to all scheduled users in the user group.

The embodiment limits the value of $\alpha_i$, thereby achieving the purpose of generating MIMO+BF weight of the user group.

For example, the user group currently scheduled by the transmission end has three users, namely, $u_1$, $u_2$, $u_3$; the corresponding beam-forming weights are $W_1$, $W_2$, $W_3$ respectively; then the weight of the user group is $W_{BF}=W_1+W_2+W_3)/3$.

For another example, the user group currently scheduled by the transmission end has three users, respectively marked as $u_1$, $u_2$, $u_3$; the corresponding beam-forming weights are $W_1$, $W_2$, $W_3$ respectively; the proportions of resources allocated thereof are $P_1$, $P_2$, $P_3$ respectively, and $P_1+P_2+P_3=1$; then the weight of the user group is $W_{BF}=p_1W_1+p_2W_2+p_3W_3$.

Preferably, the step of generating scheduling priority coefficients of the user groups according to the scheduling priority coefficients of users in the user groups comprises the steps of: determining the scheduling priority coefficient $c_i$ of each user in the user group, in which, $i=1, 2, \ldots N_g$, $N_g$ represents the number of all users in the user group; and generating the scheduling priority coefficient $$P = \sum_{i=1}^{N_y} \beta_i c_i$$

of the user group, in which, $\beta_i$ represents the weight coefficient of the ith user in the user group.

The embodiment generates the priority of the user group according to the priorities of users in the user group, thereby realizing the scheduling of resources with user group as a unit.

The preferred embodiment above is illustrated below by a specific embodiment; the users served by one transmission end are divided into three user groups and $\Omega_1=\{u_{11}, u_{12}, \ldots, u_{1N_1}\}$, $\Omega_2=\{u_{21}, u_{22}, \ldots, u_{2N_2}\}$.

The priority coefficients of users in each user group are calculated, wherein the priority coefficients of users in $\Omega_1=\{u_{11}, u_{12}, \ldots, u_{1N_1}\}$, are $P_{11}=c_{11}$, $P_{12}=c_{12}$, ..., $P_{1N1}=c_{1N1}$, the priority coefficients of users in $\Omega_2=\{u_{21}, u_{22}, \ldots, u_{2N_2}\}$ are $P_{21}=c_{21}$, $P_{22}=c_{22}$, ..., $P_{2N2}=c_{2N2}$, the priority coefficients of users in $\Omega_3=\{u_{31}, u_{32}, \ldots, u_{3N_3}\}$ are $P_3=c_{31}, \ldots, P_{3N3}=c_{3N3}$.

The generated priority coefficients of the first user group, the second user group and the third user group are $$P_1 = \sum_{i=1}^{N_1} \beta_i c_{1i}, \; P_2 = \sum_{i=1}^{N_2} \beta_i c_{2i}, \; P_3 = \sum_{i=1}^{N_3} \beta_i c_{3i}$$

respectively. If $P_1>P_2>P_3$, the first group of users can be scheduled first, then second group of users is scheduled and finally the third group of users is scheduled. After the first group of users is allocated with a resource block, the resources in the resource block are allocated according to the priority coefficient of each user in the group, and the users with higher priority are scheduled preferentially; after the second and third groups of users are allocated with resources, resources are allocated according to the priority coefficient of each user in the groups, and the users with higher priority are scheduled preferentially.

The present invention further provides a preferred embodiment which is combined with the scheme of the preferred embodiment above, and the description is provided below:

There are $N_u$ users served by one transmission end: the set of all users is defined as $\Omega$; the user i is marked as $u_i$; the corresponding weight is an M×N matrix which is marked as $i=1, 2, \ldots, N_u$. A threshold is set as Thr; users are grouped by the following method:

1) initializing the current search set $\Omega_c$ to be the set $\Omega$ of all users served by the transmission end, that is $\Omega_c=\Omega$, wherein the set of grouped users is $\Omega_f=\emptyset$ and $q=1$.

2) selecting in the current search set $\Omega_c$ a user $u_{I_q}$ with index of $I_q$ as the benchmark user of the first user group served by the transmission end based on certain search principles, then calculating the MIMO+BF weight distance $d_{j,I_q}=d(W_j, W_{I_q})$ between all other users j ($j=1, \ldots |\Omega_c|, j\neq I_q$) in the $\Omega_c$ and the user $u_{I_q}$, and selecting all users j satisfying $d_{j,I_q}\leq$Thr to form a user group set $\cap_q$; the MIMO+BF weight distance between two matrixes is $$d(W_i, W_j) = \sum_{k=1}^{M} \sum_{h=1}^{N} |w_{k,h}^{(j)} - w_{k,h}^{(i)}|^p.$$

3) updating the grouped user set $\Omega_f$ as $\Omega_f=\Omega_f \cup \Omega_q$, updating the current search set as $\Omega_c=\Omega-\Omega_f$, that is, transferring the users in the $\Omega_q$ from the to-be-grouped user set to the grouped user set.

4) repeating Step 2) and Step 3) until $\Omega_c$ is a null set.

Provided that users are divided into three groups as follows finally:

$$\Omega_1 = \{u_{I_{11}}, u_{I_{12}}, \ldots, u_{I_{1N_1}}\}, \Omega_2 = \{u_{I_{21}}, u_{I_{22}}, \ldots, u_{I_{2N_2}}\},$$
$$\Omega_3 = \{u_{I_{31}}, u_{I_{32}}, \ldots, u_{I_{3N_3}}\}$$

then resources are allocated to users by the following method:

1) calculating the priority coefficients of users in each user group, wherein the priority coefficients of users in $$\Omega_1 = \{u_{I_{11}}, u_{I_{12}}, \ldots, u_{I_{1N_1}}\}$$

are $P_{11}=c_{11}$, $P_{12}=c_{12}$, $P_{1N1}=c_{1N1}$, the priority coefficients of users in $$\Omega_2 = \{u_{I_{21}}, u_{I_{22}}, \ldots, u_{I_{2N_2}}\}$$

are $P_{21}=c_{21}$, $P_{22}=c_{22}$, $P_{2N2}=c_{2N2}$, the priority coefficients of users in $$\Omega_3 = \{u_{I_{31}}, u_{I_{32}}, \ldots, u_{I_{3N_3}}\} \text{ are } P_{31} = c_{31}, \ldots P_{3N_3} = c_{3N_3}.$$

2) respectively calculating the priority coefficients of the first user group, the second user group and the third user group, $$P_1 = \sum_{i=1}^{N_1} \beta_i c_{1i}, \; P_2 = \sum_{i=1}^{N_2} \beta_i c_{2i}, \; P_3 = \sum_{i=1}^{N_3} \beta_i c_{3i}; \text{ if } P_1 > P_2 > P_3,$$

the first group of users can be scheduled first, then second group of users is scheduled and finally the third group of users is scheduled. After the first group of users is allocated with a resource block, the resources in the resource block are allocated according to the priority coefficient of each user in the group, and the users with higher priority are scheduled preferentially; after the second and third groups of users are allocated with resources, resources are scheduled according to the priority coefficient of each user in the groups, and the users with higher priority are scheduled preferentially.

The MIMO+BF weights corresponding to the first group are $$W_{l_{11}}, W_{l_{12}}, \ldots, W_{l_{1N_1}};$$

then the MIMO+BF weight of the group is calculated as $$W_{BF}^{(1)} = (W_{l_{11}} + W_{l_{12}} + \ldots + W_{l_{1N_1}})/N_1;$$

the beam-forming weights of the second group of users and the third group of users are calculated according to the beam-forming weights of users in the group by the same method and respectively are $W_{BF}^{(2)}$, $W_{BF}^{(3)}$.

After the data of the first group of users is processed by the MIMO+BF weight $W_{BF}^{(1)}$, the data is transmitted out by the corresponding antenna; after the data of the second group of users is processed by the MIMO+BF weight $W_{BF}^{(2)}$, the data is transmitted out by the corresponding antenna; after the data of the third group of users is processed by the MIMO+BF weight $W_{BF}^{(3)}$, the data is transmitted out by the corresponding antenna.

Figures 8, 9:
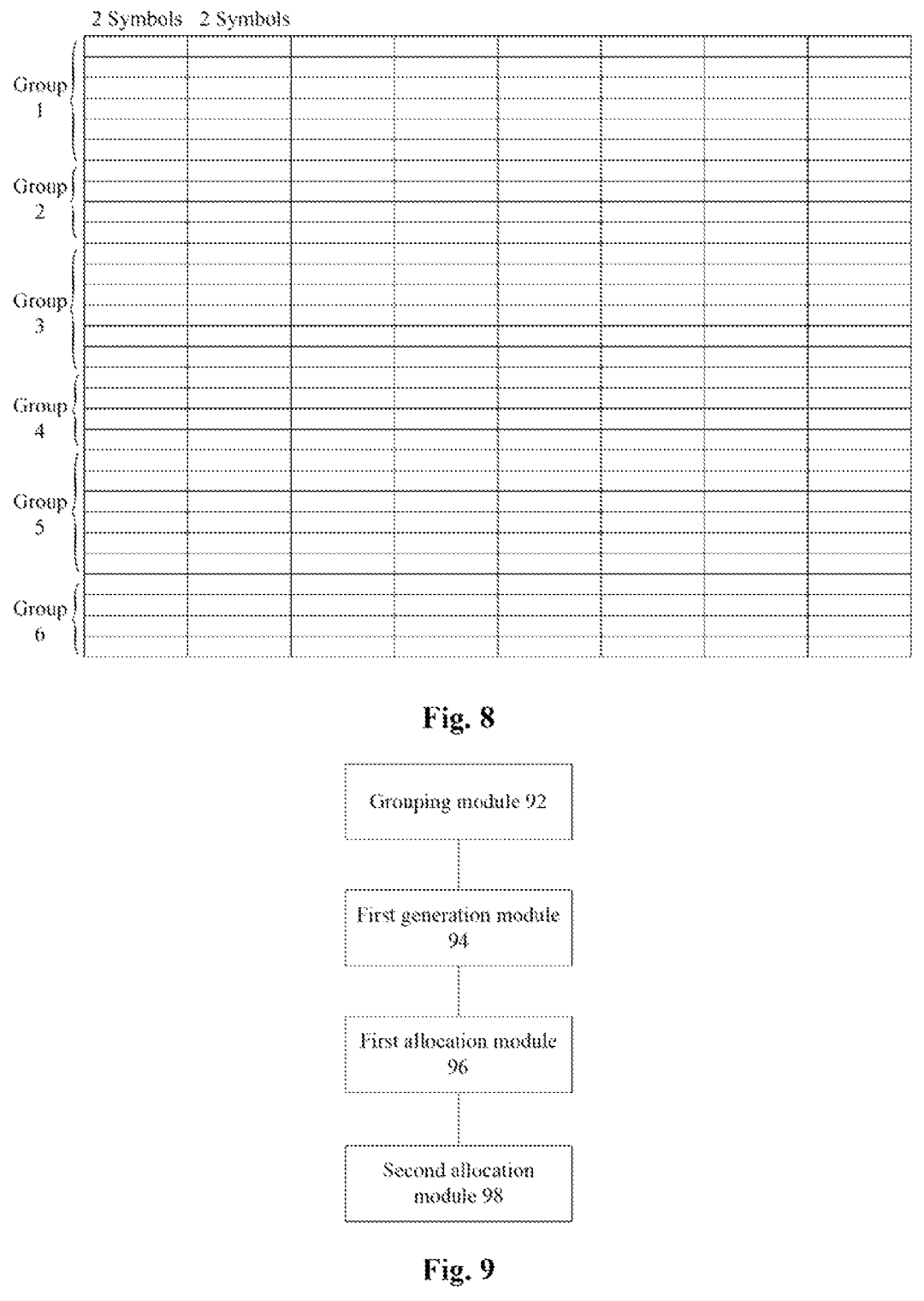

FIG. 9 shows a structure diagram of a transmission end according to the embodiment of the invention, wherein the transmission end comprises: a grouping module 92, a first generation module 94, a first allocation module 96 and a second allocation module 98, in which, the grouping module 92 is configured to divide subordinate users into user groups according to the MIMO+BF weight distances of the subordinate users; the first generation module 94 is coupled to the grouping module 92 and is configured to generate a scheduling priority coefficient for each of the user groups according to scheduling priority coefficients of respective users in the user group; the first allocation module 96 is coupled to the generation module 94 and is configured to allocate resources to the user groups according to the respective scheduling priority coefficients of the user groups; and the second allocation module 98 is coupled to the first allocation module 96 and is configured to allocate resources to each user in the user groups according to the respective scheduling priority coefficients of users in the user groups.

Figure 10:
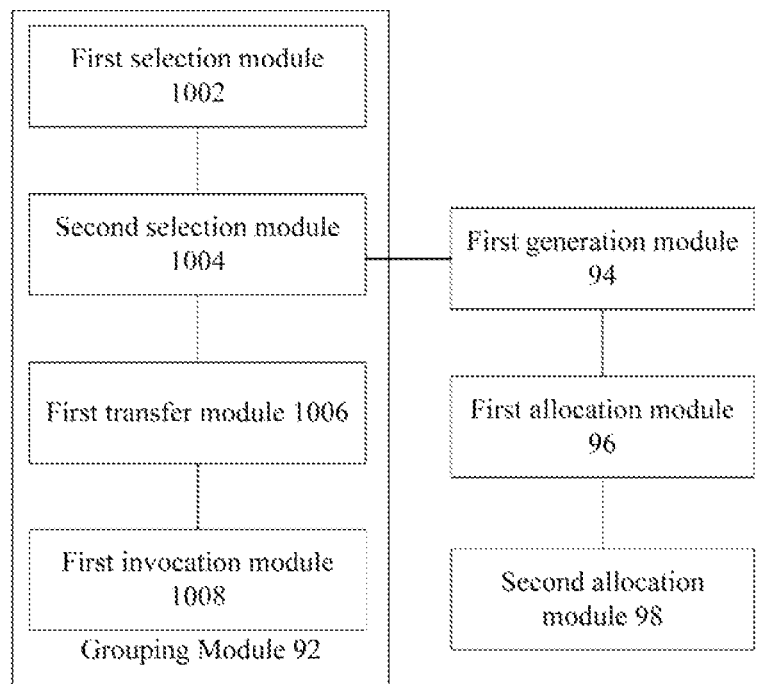
FIG. 10 shows a first specific structure diagram of a transmission end according to the embodiment of the invention.

FIG. 10 shows a first specific structure diagram of a transmission end according to the embodiment of the invention; wherein the grouping module 92 comprises: a first selection module 1002, a second selection module 1004, a first transfer module 1006 and a first invocation module 1008, in which, the first selection module 1002 is configured to select a benchmark user from users that have not been assigned to any user group; the second selection module 1004 is coupled to the first selection module 1002 and is configured to identify, among the users that have not been assigned to any user group, users whose respective MIMO+BF weight distance to the benchmark user is less than or equal to a preset value, and is configured to group the identified users and the benchmark user into a respective user group; the first transfer module 1006 is coupled to the second selection module 1004 and is configured to transfer the users in the respective user group from the users that have not been assigned to any user group to users that have been assigned to at least one of the user groups; the first invocation module 1008 is coupled to the first transfer module 1006 and is configured to, in the condition that the number of the to-be-grouped users is not 0, repeatedly invoke the first selection module, the second selection module and the first transfer module until no user has not been assigned to a user group.

Figure 11:
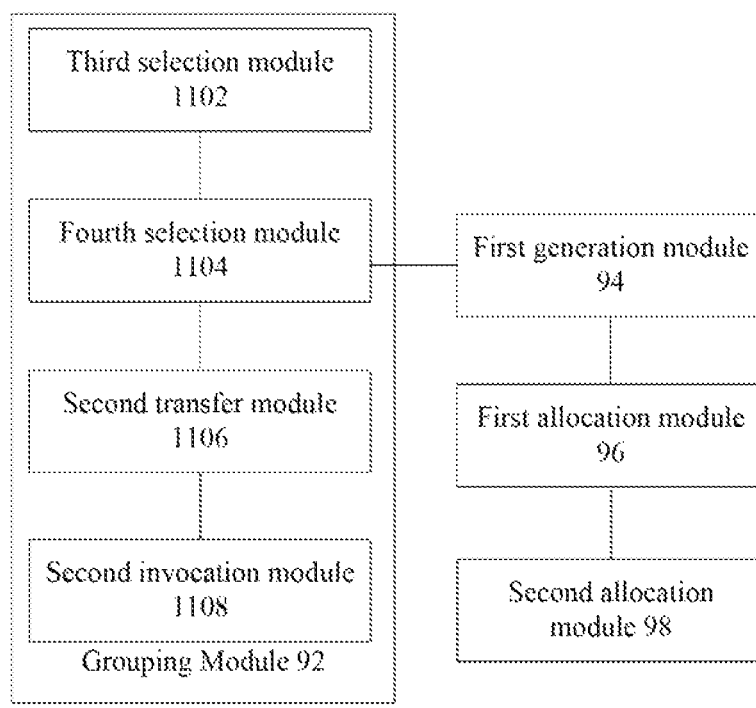
FIG. 11 shows a second specific structure diagram of transmission end according to the embodiment of the invention.

FIG. 11 shows a second specific structure diagram of a transmission end according to the embodiment of the invention; wherein the grouping module 92 comprises: a third selection module 1102, a fourth selection module 1104, a second transfer module 1106 and a second invocation module 1108, in which, the third selection module 1102 is configured to select a benchmark user from users that have not been assigned to any user group; the fourth selection module 1104 is coupled to the third selection module 1102 and is configured to identify, among the users that have not been assigned to any user group, users whose respective MIMO+BF weight distance to the benchmark user is less than or equal to a preset value, wherein an MIMO+BF weight distance between any two of the identified users is less than or equal to the preset value, and is configured to group the identified users and the benchmark user into a respective user group; the second transfer module 1106 is coupled to the fourth selection module 1104 and is configured to transfer the users in the respective user group from the users that have not been assigned to any user group to users that have been assigned to at least one of the user groups; and the second invocation module 1106 is coupled to the second transfer module 1106 and is configured to, in the condition that the number of the to-be-grouped users is greater than or equal to 2, repeatedly invoke the third selection module, the fourth selection module and the second transfer module until no more than one user is left to be assigned to any user group.

Figure 12:
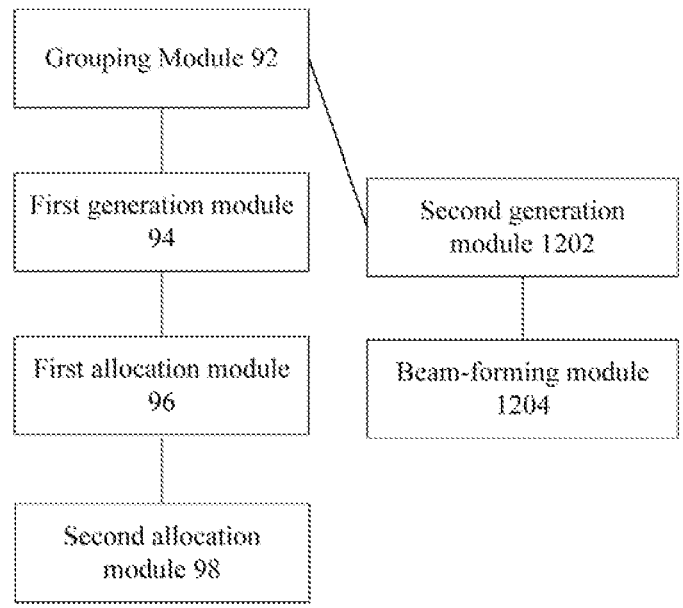
FIG. 12 shows a third specific structure diagram of a transmission end according to the embodiment of the invention.

FIG. 12 shows a third specific structure diagram of a transmission end according to the embodiment of the invention; wherein the transmission end comprises: a second generation module 1202 and a beam-forming module 1204, in which, the second generation module 1202 is configured to generate a beam-forming weight for a respective user group according to a respective MIMO+BF weight of each user in the user group; and the beam-forming module 1204 is coupled to the generation module 1202 and is configured to perform beam-forming for data associated with scheduled users in the user group by using the beam-forming weight of the user group.

Figure 13:
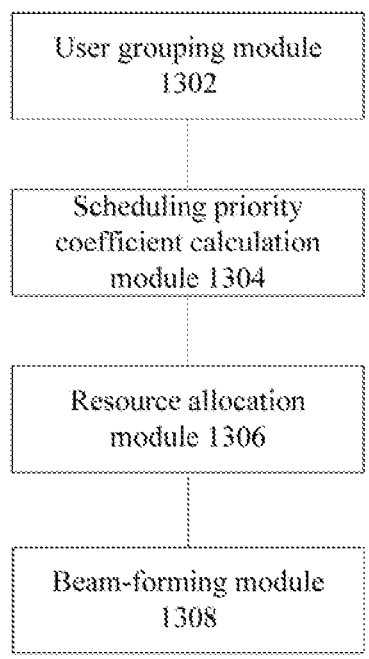
FIG. 13 shows another structure diagram of a transmission end according to the embodiment of the invention.

FIG. 13 shows another structure diagram of a transmission end according to the embodiment of the invention, wherein the transmission end further comprises: a user grouping module 1302, a scheduling priority coefficient calculation module 1304, a resource allocation module 1306 and a beam-forming module 1308, in which, the user grouping module 1302 corresponds to the grouping module 92 and is configured to group the users belonging to the transmission end; the scheduling priority coefficient calculation module 1304 is coupled to the user grouping module 1302 and corresponding to the first generation module 94 and is configured to calculate the scheduling priority coefficients of users in each user group and calculate the scheduling priority coefficient of the user group according to the scheduling priority coefficients of users in each user group; the resource allocation module 1306 is coupled to the scheduling priority coefficient calculation module 1304, corresponding to the first allocation module 96 and the second allocation module 98 and is configured to allocate resources to user groups according to the scheduling priority coefficient of each user group and allocate resources to users in the group according to the scheduling priority coefficients of users in the group; the beam-forming module 1308 is coupled to the resource allocation module 1306 and is configured to calculate the MIMO+BF weight of a user group according to the MIMO+BF weight of each user in the group, perform weighting for the data stream of the user group by the MIMO+BF weight of the group and then transmit out the data stream.

Scheduling resources by the device above comprises the following: there are $N_u$ users served by one transmission end; the set of all users is defined as $\Omega$; the user i is marked as $u_i$; the corresponding weight is an M×N matrix which is marked as $W_i$; i=1, 2, N. A threshold is set as Thr.

The user grouping module groups the users belonging to the transmission end, wherein $N_u$ users are divided into three groups, namely, $\Omega_1$, $\Omega_2$, $\Omega_3$.

The scheduling priority coefficient calculation module calculates the scheduling priority coefficients of users in the first user group, that is, $P_{11}=c_{11}$, $P_{12}=c_{12}$, ..., $P_{1N1}=c_{1N1}$, and calculates the scheduling priority coefficient of the user group according to the scheduling priority coefficients of users in each user group, that is, $$P_1 = \sum_{i=1}^{N_1} \beta_i c_{1i} s,$$

calculates the scheduling priority coefficients of users in the second user group, that is, $P_{21}=c_{21}$, $P_{22}=c_{22}$, ..., $P_{2N2}=c_{2N2}$ and calculates the scheduling priority coefficient of the user group according to the scheduling priority coefficients of users in each user group, that is, $$P_2 = \sum_{i=1}^{N_2} \beta_i c_{2i},$$

calculates the scheduling priority coefficients of users in third second user group, that is, $P_{31}=c_{31}$, ..., $P_{3N_3}=c_{3N_3}$, and calculates the scheduling priority coefficient of the user group according to the scheduling priority coefficients of users in each user group, that is, $$P_3 = \sum_{i=1}^{N_3} \beta_i c_{2i}.$$

The resource allocation module allocates resources to the user group according to the scheduling priority coefficient of each user group and allocates resources to the users in the group according to the scheduling priority coefficients of users in the user group.

The beam-forming module calculates the MIMO beam-forming weight of the user group according to the MIMO+BF weight of each user in the group, obtains that the beam-forming weights of the three user groups are $W_{BF}^{(1)}$, $W_{BF}^{(2)}$, $W_{BF}^{(3)}$ respectively, weights the data stream of the user group by the MIMO+BF weight of the group and then transmits out the data.

To sum up, with the present invention, the problem in the relevant technology that MIMO+BF users can not share the same group of resources is solved, the time-frequency resource utilization rate of radio communication system is improved and the number of accessible users is increased.

Obviously, those skilled in the art should understand that the modules and steps described above can be implemented by a common computer device; the modules or steps can be integrated on a single computing device or distributed on a network composed of a plurality of computing devices; optionally, the modules or steps can be implemented by a programming code executable by a computing device, thus they can be stored in a storage device to execute by a computing device, or manufactured into individual integrated circuit module respectively, or several of them can be manufactured into a single integrated circuit module to realize; in this way, the present invention is not limited to any combination of specific hardware and software The above is only the preferred embodiment of the invention and not intended to limit the present invention. For those skilled in the art, various modifications and changes can be made to the present invention. Any modification, equivalent substitute and improvement within the spirit and principle of the present invention are deemed to be included within the protection scope of the present invention.

The invention claimed is:

1. A downlink resource scheduling method for a multiple-input multiple-output beam-forming (MIMO+BF) system, comprising the steps of:
   a transmission end:
      dividing subordinate users into user groups according to respective MIMO+BF weights of the subordinate users;
      generating a scheduling priority coefficient for each of the user groups according to scheduling priority coefficients of respective users in the user group;
      allocating group resources to the user groups according to the respective scheduling priority coefficients of the user groups; and
      allocating sub-channel resources of the group resources to each user in the user groups according to the respective scheduling priority coefficients of users in the user groups.

2. The method according to claim 1, wherein the step of dividing users into user groups according to the MIMO+BF weights of the respective users further comprises the steps of:
   selecting a benchmark user from users that have not been assigned to any user group;
   identifying, among the users that have not been assigned to any user group, users whose respective MIMO+BF weight distance to the benchmark user is less than or equal to a preset value, and grouping the identified users and the benchmark user into a respective user group;
   transferring the users in the respective user group from the users that have not been assigned to any user group to users that have been assigned to at least one of user groups; and
   repeating the aforementioned steps until no user has not been assigned to a user group.

3. The method according to claim 1, wherein the step of dividing users into user groups according to the MIMO+BF weights of the respective users further comprises the steps of:
   selecting a benchmark user from users that have not been assigned to any user group;
   identifying, among the users that have not been assigned to any user group, users whose respective MIMO+BF weight distance to the benchmark user is less than or equal to a preset value, wherein an MIMO+BF weight distance between any two of the identified users is less than or equal to the preset value, and grouping the identified users and the benchmark user into a respective user group;
   transferring the users in the respective user group from the users that have not been assigned to any user group to users that have been assigned to at least one of the user groups; and repeating the aforementioned steps until no more than one user is left to be assigned to any user group.

4. The method according to claim 2, wherein the distance of MIMO+BF weight between two respective users is defined as $d_{i,j}=d(W_i, W_j)$ which includes one of the following:

$$d(W_i, W_j) = \lambda_{max}(W_i W_i^H - W_j W_j^H),$$

$$d(W_i, W_j) = \sum_{k=1}^{M} \sum_{h=1}^{N} |w_{k,h}^{(j)} - w_{k,h}^{(i)}|^P,$$

$$d(W_i, W_j) = \left( \sum_{k=1}^{M} \sum_{h=1}^{N} |w_{k,h}^{(j)} - w_{k,h}^{(i)}|^P \right)^{\frac{1}{P}},$$

$$d(W_i, W_j) = \max\{|w_{1,1}^{(j)} - w_{1,1}^{(i)}|^P, \ldots, |w_{M,N}^{(j)} - w_{M,N}^{(i)}|^P\},$$

wherein, $\lambda_{max}(W_i W_i^H - W_j W_j^H)$ represents a maximum eigenvalue of matrix $W_i W_i^H - W_j W_j^H$;

$$W_i = \begin{pmatrix} w_{1,1}^{(i)} & \cdots & w_{1,N}^{(i)} \\ \vdots & \ddots & \vdots \\ w_{M,1}^{(i)} & \cdots & w_{M,N}^{(i)} \end{pmatrix}$$

represents the MIMO+BF weight of user i of the two respective users; $w_{m,j}^{(i)}$ represents the MIMO+BF weight coefficient from the mth transmission antenna to the ith beam associated with the user i;

$$W_j = \begin{pmatrix} w_{1,1}^{(j)} & \cdots & w_{1,N}^{(j)} \\ \vdots & \ddots & \vdots \\ w_{M,1}^{(j)} & \cdots & w_{M,N}^{(j)} \end{pmatrix}$$

represents the MIMO+BF weight of user j of the two respective users; $w_{m,j}^{(j)}$ represents the MIMO+BF weight coefficient from the mth transmission antenna to the ith beam associated with the user j; wherein m=1, 2, . . ., M; I=1, 2, . . ., N; M represents a number of antennas of the transmission end; N represents a number of beams transmitted by the antennas of the transmission end; P is a constant greater than zero.

5. The method according to claim 2, wherein the distance of MIMO+BF weight between two respective users is defined as $d_{i,j}=d(\overline{W}_i, \overline{W}_j)$ which includes one of the following:

$$d(\overline{W}_i, \overline{W}_j) = \sqrt{1 - \left| \sum_k w_{j,k}^* * w_{i,k} \right|^P},$$

$$d(\overline{W}_i, \overline{W}_j) = \sum_k |w_{j,k} - w_{i,k}|^P,$$

$$d(\overline{W}_i, \overline{W}_j) = \left( \sum_k |w_{j,k} - w_{i,k}|^P \right)^{\frac{1}{P}},$$

$$d(\overline{W}_i, \overline{W}_j) = \max\{|w_{j,1} - w_{i,1}|^P, \ldots, |w_{j,L} - w_{i,L}|^P\},$$

wherein, each of $\overline{W}_i = (w_{i,1}, w_{i,2}, \ldots, w_{i,L})^T$ and $\overline{W}_i = (w_{i,1}, w_{i,2}, \ldots, w_{i,L})$ defines a vector of the MIMO+BF weight of user i of the two respective users; $w_{i,j}$ is one of the MIMO+BF weight coefficients associated with the user i; each of $\overline{W}_j = (w_{j,1}, w_{j,2}, \ldots, w_{j,L})^T$ and $\overline{W}_j = (w_{j,1}, w_{j,2}, \ldots, w_{j,L})$ defines a vector of the MIMO+BF weight of the user j of the two respective users: $w_{j,L}$ is one of the MIMO+BF weight coefficients associated with the user j; wherein I=1, 2, . . ., L; L represents a number of elements or non-zero elements in the MIMO+BF weight matrix of a respective user; P is a constant greater than zero.

6. The method according to claim 1, further comprising the following steps of:
generating a beam-forming weight for a respective user group according to a respective MIMO+BF weight of each user in the user group; and
performing beam-forming for data associated with scheduled users in the user group by using the beam-forming weight of the user group.

7. The method according to claim 6, wherein the step of generating the beam-forming weight of the user group according to the MIMO+BF weight of each user in the user group further comprises the steps of:
generating a MIMO+BF weight $$W_{BF} = \sum_{i=1}^{S} \alpha_i W_i$$

of the user group, wherein $W_i$, represents a MIMO+BF weight of the ith scheduled user in the user group; S is a number of scheduled users in the user group; $\alpha_i$, represents a non-negative weight coefficient of the ith user in the user group; and $$\sum_{i=1}^{S} \alpha_i = 1.$$

8. The method according to claim 7, wherein $$\alpha_i = \frac{1}{S} \text{ or } \alpha_i = P_i / P,$$

wherein, $P_i$ represents a size of sub-channel resources allocated to the ith scheduled user in the user group; P represents a sum of the sub-channel resources allocated to the scheduled users in the user group.

9. The method according to claim 1, wherein the step of generating a scheduling priority coefficient for a respective user group according to the scheduling priority coefficients of users in the user group comprises the steps of:
determining a scheduling priority coefficient $c_i$ of each user in the user group, wherein, i=1, 2, . . . $N_g$, $N_g$ represents a number of users in the user group; and
generating the scheduling priority coefficient $$P = \sum_{i=1}^{N_g} \beta_i c_i$$

of the user group, wherein, $\beta_i$ represents a weight coefficient of the ith user in the user group.

10. The method according to claim 3, wherein the distance of MIMO+BF weight between two respective users is defined as $d_{i,j}=d(W_i, W_j)$ which includes one of the following:

$$d(W_i, W_j) = \lambda_{max}(W_i W_i^H - W_j W_j^H),$$

$$d(W_i, W_j) = \sum_{k=1}^{M}\sum_{h=1}^{N} |w_{k,h}^{(j)} - w_{k,h}^{(i)}|^P,$$

$$d(W_i, W_j) = \left(\sum_{k=1}^{M}\sum_{h=1}^{N} |w_{k,h}^{(j)} - w_{k,h}^{(i)}|^P\right)^{\frac{1}{P}},$$

$$d(W_i, W_j) = \max\{|w_{1,1}^{(j)} - w_{1,1}^{(i)}|^P, \ldots, |w_{M,N}^{(j)} - w_{M,N}^{(i)}|^P\}$$

wherein, $\lambda_{max}(W_i W_i^H - W_j W_j^H)$ represents a maximum eigenvalue of matrix $W_i W_i^H - W_j W_j^H$;

$$W_i = \begin{pmatrix} w_{1,1}^{(i)} & \cdots & w_{1,N}^{(i)} \\ \vdots & \ddots & \vdots \\ w_{M,1}^{(i)} & \cdots & w_{M,N}^{(i)} \end{pmatrix}$$

represents the MIMO+BF weight of user i of the two respective users; $w_{m,i}^{(i)}$ represents the MIMO+BF weight coefficient from the mth transmission antenna to the ith beam associated with the user i;

$$W_j = \begin{pmatrix} w_{1,1}^{(j)} & \cdots & w_{1,N}^{(j)} \\ \vdots & \ddots & \vdots \\ w_{M,1}^{(j)} & \cdots & w_{M,N}^{(j)} \end{pmatrix}$$

represents the MIMO+BF weight of user j of the two respective users; $w_{m,j}^{(j)}$ represents the MIMO+BF weight coefficient from the mth transmission antenna to the ith beam associated with the user j; wherein m=1, 2, . . ., M; I=1, 2, . . . N; M represents a number of antennas of the transmission end; N represents a number of beams transmitted by the antennas of the transmission end; P is a constant greater than zero.

11. The method according to claim 3, wherein the distance of MIMO+BF weight between two respective users is defined as $d_{i,j}=d(\overline{W}_i, \overline{W}_j)$ which includes one of the following:

$$d(\overline{W}_i, \overline{W}_j) = \sqrt{1 - \left|\sum_k w_{j,k}^* * w_{i,k}\right|^P},$$

$$d(\overline{W}_i, \overline{W}_j) = \sum_k |w_{j,k} - w_{i,k}|^P,$$

$$d(\overline{W}_i, \overline{W}_j) = \left(\sum_k |w_{j,k} - w_{i,k}|^P\right)^{\frac{1}{P}},$$

$$d(\overline{W}_i, \overline{W}_j) = \max\{|w_{j,1} - w_{i,1}|^P, \ldots, |w_{j,L} - w_{i,L}|^P\},$$

wherein, each of $\overline{W}_i=(w_{i,1}, w_{i,2}, \ldots, w_{i,L})^T$ and $\overline{W}_i=(w_{i,1}, w_{i,2}, \ldots, w_{i,L})$ defines a vector of the MIMO+BF weight of user i of the two respective users; $w_{i,j}$ is one of the MIMO+BF weight coefficients associated with the user i; each of $\overline{W}_j=(w_{j,1}, w_{j,2}, \ldots, w_{j,L})^T$ and $\overline{W}_j=(w_{j,1}, w_{j,2}, \ldots, w_{j,L})$ defines a vector of the MIMO+BF weight of the user j of the two respective users; $w_{j,i}$ is one of the MIMO+BF weight coefficients associated with the user j; wherein I=1, 2, . . . L; L represents a number of elements or non-zero elements in the MIMO+BF weight matrix of a respective user; P is a constant greater than zero.

* * * * *